United States Patent
Chowdhury

(10) Patent No.: US 9,376,606 B2
(45) Date of Patent: Jun. 28, 2016

(54) POLYMER MATRICES FUNCTIONALIZED WITH LIQUID CRYSTALS FOR ENHANCED THERMAL CONDUCTIVITY

(71) Applicant: Laird Technologies, Inc., Earth City, MO (US)

(72) Inventor: Sumana Roy Chowdhury, Karnataka (IN)

(73) Assignee: Laird Technologies, Inc., Earth City, MO (US)

( * ) Notice: Subject to any disclaimer, the term of this patent is extended or adjusted under 35 U.S.C. 154(b) by 0 days.

(21) Appl. No.: 14/701,808

(22) Filed: May 1, 2015

(65) Prior Publication Data

US 2015/0232734 A1    Aug. 20, 2015

Related U.S. Application Data

(63) Continuation of application No. PCT/US2013/060304, filed on Sep. 18, 2013.

(51) Int. Cl.
   *C09K 5/14* (2006.01)
   *C09K 19/36* (2006.01)
   *C09K 19/40* (2006.01)

(52) U.S. Cl.
   CPC .  *C09K 5/14* (2013.01); *C09K 19/36* (2013.01); *C09K 19/408* (2013.01)

(58) Field of Classification Search
   None
   See application file for complete search history.

(56) References Cited

U.S. PATENT DOCUMENTS

| | | | |
|---|---|---|---|
| 3,935,337 A * | 1/1976 | Taylor | 427/180 |
| 4,316,041 A * | 2/1982 | Totten et al. | 556/420 |
| 4,358,391 A * | 11/1982 | Finkelmann et al. | 252/299.01 |
| 4,388,453 A * | 6/1983 | Finkelmann et al. | 528/15 |
| 4,410,570 A * | 10/1983 | Kreuzer et al. | 427/374.1 |
| 4,774,028 A * | 9/1988 | Imai et al. | 552/505 |
| 4,981,607 A * | 1/1991 | Okawa et al. | 252/299.01 |
| 5,211,877 A * | 5/1993 | Andrejewski et al. | 252/299.01 |
| 5,437,816 A * | 8/1995 | Endo et al. | 252/299.65 |
| 5,610,258 A * | 3/1997 | Weitzel et al. | 528/25 |
| 5,641,850 A * | 6/1997 | Stohrer et al. | 528/15 |
| 6,300,454 B1 * | 10/2001 | Hanelt et al. | 528/27 |
| 2003/0017182 A1 * | 1/2003 | Tournilhac | A61K 8/0295 424/401 |
| 2005/0061496 A1 | 3/2005 | Matabayas, Jr. | |
| 2010/0243227 A1 | 9/2010 | Wu et al. | |

FOREIGN PATENT DOCUMENTS

WO    WO 2014/105227    7/2014

OTHER PUBLICATIONS

Data sheet for titanium dioxide, 2 pages, Azo materials, 2016.*

(Continued)

*Primary Examiner* — Robert S Loewe
(74) *Attorney, Agent, or Firm* — Harness, Dickey & Pierce, P.L.C.

(57) ABSTRACT

According to various aspects, exemplary embodiments are disclosed of thermally conductive composites that include a polymer matrix functionalized with liquid crystals grafted onto the polymer matrix. Also disclosed are methods that generally include modifying liquid crystals and incorporating the modified liquid crystals into a polymer matrix such that the modified liquid crystals are grafted onto the polymer matrix.

22 Claims, 2 Drawing Sheets

(56) References Cited

OTHER PUBLICATIONS

Figure 1:
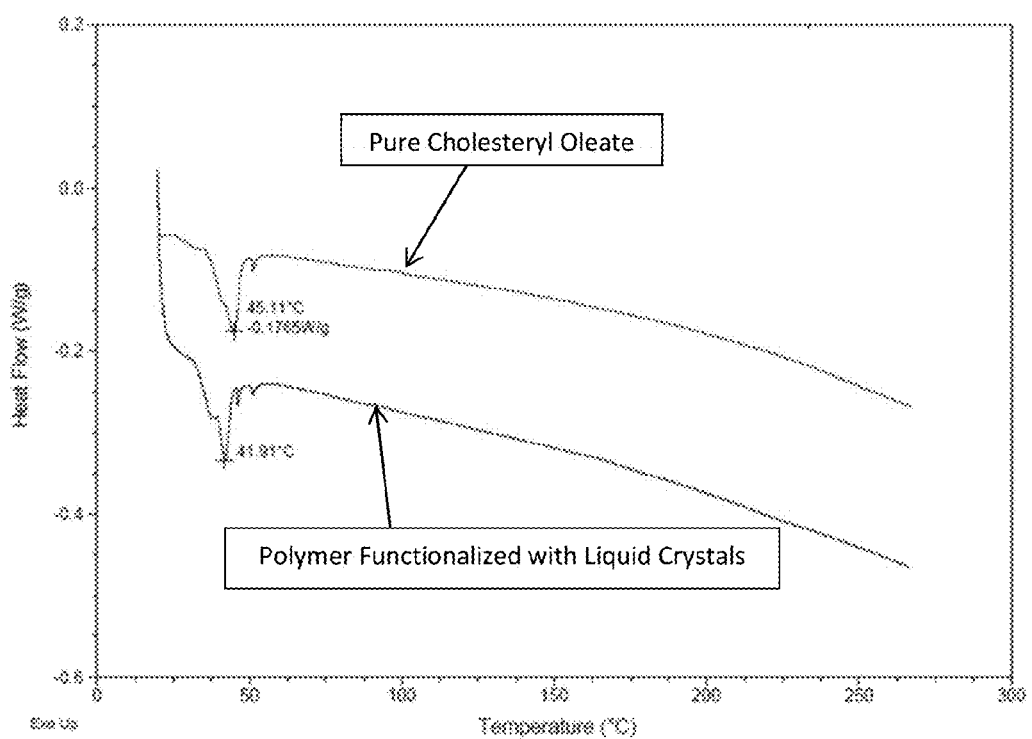

International Search Report and Written Opinion dated Dec. 24, 2013 for PCT Application No. PCT/US2013/060304 (WO 2014/105227). The instant application is a continuation of PCT Application No. PCT/US2013/060304;10 pages.

Lee, Tzong-Mind et al., Proceedings of the 2005 IEEE 55th Electronic Components and Technology Conference, pp. 55-59.

Rao, Huaxin et al., Reactive and Functional Polymers 2011, vol. 71, No. 5, pp. 537-543.

Sarvar, Farhad et al., Proceedings of the 2006 IEEE 1st Electronics Systemintegration Technology Conference, pp. 1292-1302.

* cited by examiner

POLYMER MATRICES FUNCTIONALIZED WITH LIQUID CRYSTALS FOR ENHANCED THERMAL CONDUCTIVITY

CROSS-REFERENCE TO RELATED APPLICATIONS

This application is a continuation of PCT International application No. PCT/US2013/060304 filed Sep. 18, 2013 (published as WO 2014/105227 on Jul. 3, 2014), which in turn, claims priority to India Patent Application No. 4029/DEL/2012 filed Dec. 27, 2012. The entire disclosures of the above applications are incorporated herein by reference.

FIELD

The present disclosure relates to polymer matrices functionalized with liquid crystals for enhanced thermal conductivity.

BACKGROUND

This section provides background information related to the present disclosure which is not necessarily prior art.

Electronic components, such as semiconductors, transistors, etc., typically have pre-designed temperatures at which the electronic components optimally operate. Ideally, the pre-designed temperatures approximate the temperature of the surrounding air. But the operation of electronic components generates heat which, if not removed, will cause the electronic component to operate at temperatures significantly higher than its normal or desirable operating temperature. Such excessive temperatures may adversely affect the operating characteristics, lifetime, and/or reliability of the electronic component and the operation of the associated device.

To avoid or at least reduce the adverse operating characteristics from the heat generation, the heat should be removed, for example, by conducting the heat from the operating electronic component to a heat sink. The heat sink may then be cooled by conventional convection and/or radiation techniques. During conduction, the heat may pass from the operating electronic component to the heat sink either by direct surface contact between the electronic component and heat sink and/or by contact of the electronic component and heat sink surfaces through an intermediate medium or thermal interface material. The thermal interface material may be used to fill the gap between thermal transfer surfaces, in order to increase thermal transfer efficiency as compared to having the gap filled with air, which is a relatively poor thermal conductor. In some devices, an electrical insulator may also be placed between the electronic component and the heat sink, in many cases this is the thermal interface material itself.

SUMMARY

This section provides a general summary of the disclosure, and is not a comprehensive disclosure of its full scope or all of its features.

According to various aspects, exemplary embodiments are disclosed of thermally conductive composites that include a polymer matrix functionalized with liquid crystals grafted onto the polymer matrix. Also disclosed are methods that generally include modifying liquid crystals and incorporating the modified liquid crystals into a polymer matrix such that the modified liquid crystals are grafted onto the polymer matrix.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 is an exemplary line graph of differential scanning calorimetry results showing heat flow in watts per gram (W/g) versus temperature in degrees Celsius for a polymer matrix functionalized with liquid crystals in accordance with exemplary embodiments disclosed herein and for pure cholesteryl oleate.

Figure 2:
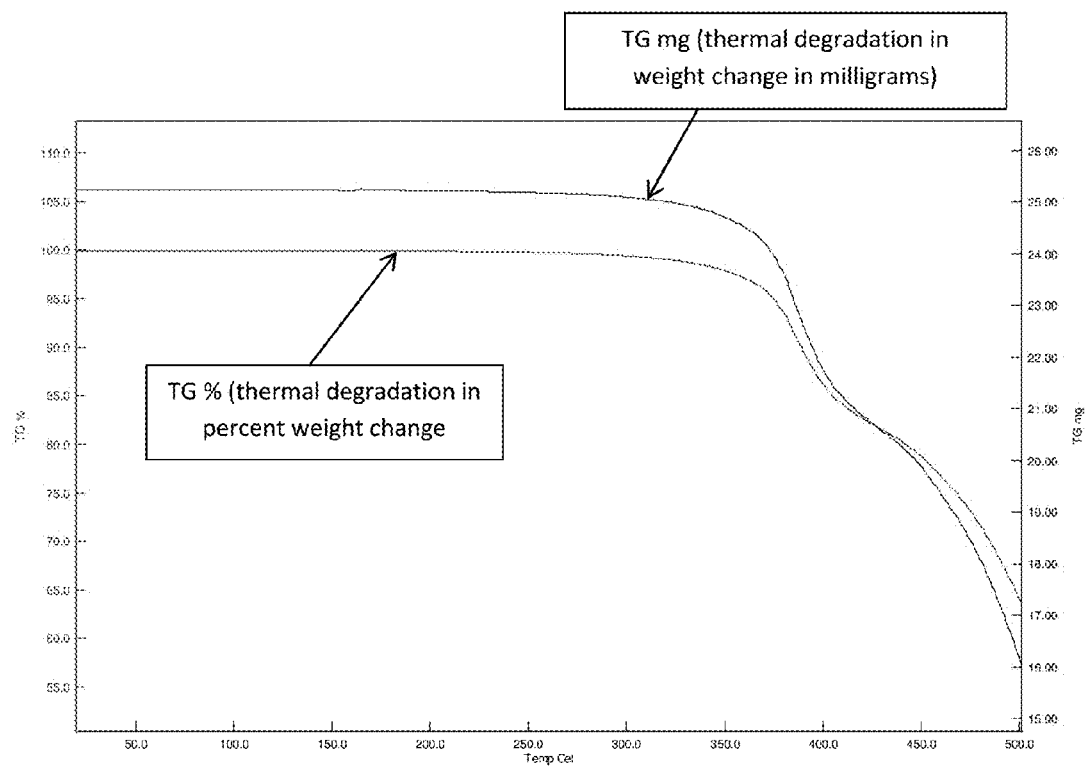

FIG. 2 is an exemplary line graph of thermogravimetric analysis results showing thermal degradation in percent weight change (left vertical axis) and weight change in milligrams (right vertical axis) versus temperature in degrees Celsius for a polymer matrix functionalized with liquid crystals in accordance with exemplary embodiments disclosed herein.

DETAILED DESCRIPTION

Example embodiments will now be described more fully with reference to the accompanying drawings.

Higher thermal conductivities may be achievable for thermal interface materials (e.g., gap fillers, etc.) and other materials (e.g., thermally and/or electrically conductive plastics, etc.) by enhancing the intrinsic thermal conductivity of the base matrix without having to further incorporate or increase the loading amount of thermally conductive filler in the matrix. Accordingly, the inventor hereof has developed and discloses herein polymer (e.g., thermoset polymer, etc.) matrices functionalized with liquid crystals, where the functionalization provides or enhances the base polymer matrix such that it has a higher thermal conductivity without having to increase the level of filler loading. This, in turn, also allows a thermally conductive polymer composite that includes the polymer matrix functionalized with liquid crystals to also have a higher thermal conductivity without having to increase the level of filler loading.

Also disclosed herein are exemplary methods of enhancing thermal conductivity of a polymer matrix by modifying liquid crystals and grafting the modified liquid crystals onto the polymer matrix. Accordingly, aspects of the present disclosure relate to matrix enhancement by modifying liquid crystals and incorporating the modified liquid crystals into a polymer matrix such that the modified liquid crystals are grafted onto the polymer matrix. The functionalized, thermally enhanced matrix may be used, for example, for thermal interface materials, thermally conductive plastics, thermally and/or electrically conductive plastics, etc.

In exemplary embodiments, the polymer matrix functionalized with liquid crystals has enhanced or improved thermal conductivity, while also retaining its desired deflection properties and electrical insulation properties. In such exemplary embodiments, the resulting thermally conductive composite may also be considered a soft, conformable, pliable thermal interface material (e.g., a gap filler, etc.) that is also a dielectric or electrical insulator. In other exemplary embodiments, the electrical conductivity of a thermally conductive composite may be tunable. Accordingly, the thermally conductive composite may thus be electrically insulative or electrically conductive composites depending on the particular filler loading, etc.

By way of background, liquid crystals are matter in a state that has properties between those of conventional liquid and those of solid crystal. For example, a liquid crystal may flow like a liquid, but the molecules of the liquid crystals may be orientated in a crystal-like way. Liquid crystals are organic materials with long range order in one direction. In view of this crystallinity in one direction, the thermal conductivity will be similar or more comparable to an amorphous structure.

According to aspects of the present disclosure, exemplary embodiments include grafting of liquid crystalline units, such as cholesteryl groups, onto a siloxane chain so as to generate some liquid crystalline units in the amorphous silicone matrix. Presence of such ordered liquid crystalline units increases thermal conductivity of the polymer matrix. The amount of liquid crystalline units to be grafted onto the silicone chains may vary depending on the particular application or end use. For example, the amount may need to be optimized so as to obtain or strike a good balance between the hardness/softness of the matrix and the thermal conductivity enhancement of the silicone matrix. By way of example, the amount of liquid crystal in the polymer matrix may range from about 10 weight percent to about 20 weight percent. Or the amount of liquid crystal may be less than 10 weight percent or higher than 20 weight percent. Functionalization of a polymer matrix with liquid crystals may enhance or improve thermal conductivity of the polymer matrix by about 10% to about 15%, by more than 15%, or by less than 10%.

The figure immediately below represents an exemplary embodiment of a method of enhancing thermal conductivity of a polymer matrix by modifying liquid crystals and then grafting the modified liquid crystals onto the polymer matrix.

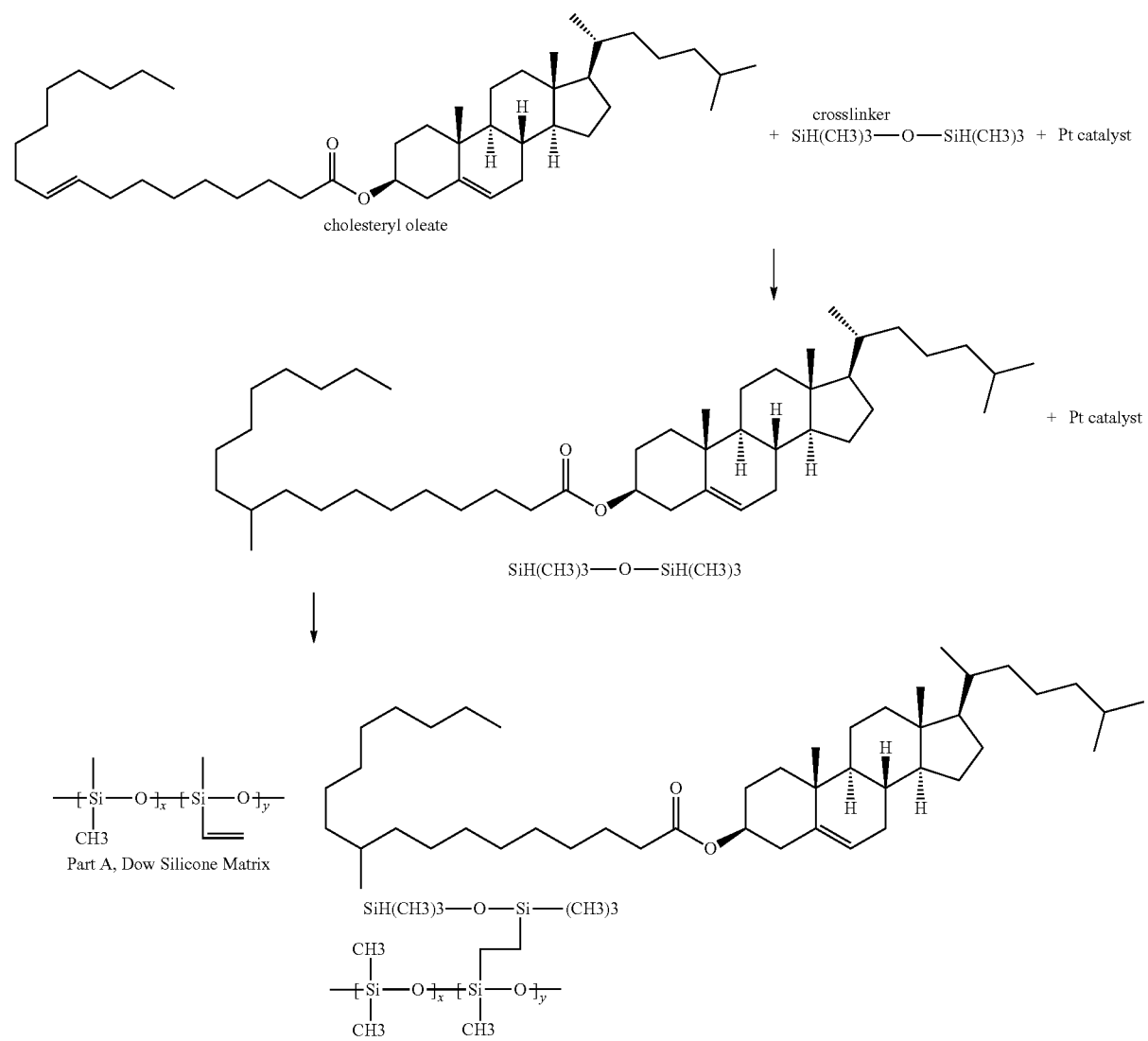

In this exemplary method, a first step, process, or operation includes using a cross linker that is attached to cholesteryl ester based liquid crystalline units in order to decouple the liquid crystalline units from the polymer backbone. This first step, process, or operation includes the cross linker, CHOL-COO(CH2)7-CH is the liquid crystalline moiety, and a platinum based catalyst (e.g., platinum-divinyltetramethylsiloxane, etc.). By way of example only, this first step, process, or operation that results in the cross linker attached to the cholesteryl ester unit may occur in the presence of the platinum based catalyst at a temperature of about 50° C. In other exemplary embodiments, the reaction temperature may be higher or lower than 50° C. such as within a range from room temperature (e.g., about 20° C. to 25° C., etc.) to about 150° C.

A second step, process, or operation includes a hydrosilation reaction. By using the Si—H group of the cross linker attached to the cholesteryl ester liquid crystalline units, the hydrosilation reaction is carried out to attach the cholesteryl liquid crystalline units onto the silicone chains. With this exemplary method, the cholesteryl oleate liquid crystalline units are chemically bonded or covalently coupled to the silicone chains via the hydrosilation reaction and become an integral part of the cross-linked polymer system. This hydrosilation reaction is also represented below. The hydrosilation reaction results in silicone chains with grafted cholesteryl liquid crystalline units. During this hydrosilation reaction, the Si—H group of the cross linker is reacted with the silicone chains in the presence of a platinum based catalyst. In this example, the silicone chains are vinyl-terminated PDMS (polydimethylsiloxane) chains of a first part of a two-part silicone matrix. The two-part host matrix may comprise a curable silicone rubber from Dow Corning Corporation, which has two parts, vinyl-terminated PDMS chains (Part A) and PDMS chains. This example hydrosilation reaction is between the vinyl-terminated PDMS chains (Part A of a two-part silicone matrix) and the Si—H groups of the cross linker attached to the cholesteryl ester liquid crystalline units. By way of example only, this hydrosilation reaction may occur in the presence of the platinum based catalyst (e.g., platinum-divinyltetramethylsiloxane, etc.) at a temperature of about 110° C. In other exemplary embodiments, the reaction temperature may be higher or lower than 110° C. such as within a range from room temperature (e.g., about 20° C. to 25° C., etc.) to about 150° C.

This exemplary method also includes a third step, process, or operation in which the silicone with liquid crystalline units (e.g., Part A of a two-part silicone matrix with grafted cholesteryl liquid crystalline units, etc.) undergoes or is subjected to an annealing process. In an exemplary embodiment, Part A of a two-part silicone matrix with grafted cholesteryl liquid crystalline units is annealed at a temperature of about 38° C. for about 12 hours and then cured (e.g., in an oven, etc.) with Part B of the two-part silicone matrix at about 100° C. for about 45 minutes. At these temperatures, the liquid crystallinity is retained. And, the curing helps lock the liquid crystalline order in the silicone matrix. The process temperatures and durations disclosed herein are examples only as higher or lower temperatures and/or shorter or longer durations may be used depending on the particular materials being used.

Thermal properties of polymer matrices functionalized with liquid crystals in accordance with exemplary embodiments disclosed herein were studied using a thermogravimetric analyzer and a differential scanning calorimeter. FIGS. 1 and 2 provide analysis results measured for polymer matrices functionalized with liquid crystals in accordance with exemplary embodiments disclosed herein. These analysis results shown in FIGS. 1 and 2 are provided only for purposes of illustration and not for purposes of limitation.

More specifically, a differential scanning calorimetry analysis was performed on a polymer matrix functionalized with liquid crystals by using a differential scanning calorimeter. FIG. 1 is a line graph of the differential scanning calorimetry results showing heat flow in watts per gram (W/g) versus temperature in degrees Celsius for the polymer matrix functionalized with liquid. For comparison purposes, FIG. 1 also includes differential scanning calorimetry results for pure cholesteryl oleate. Generally, FIG. 1 shows that the endotherm for liquid crystal ordering is a lower temperature (about 41.91° C.) for the siloxane-liquid crystal system of the polymer matrix functionalized with liquid crystals as compared to pure cholesteryl oleate (about 45.11° C.) due to dilution of liquid crystallinity from the polymer backbone.

In the line graph shown in FIG. 1, the vertical axis is labeled Heat Flow (W/g) with −0.6 and 0.2 as the end points with additional marks or ticks spaced along this axis in increments of 0.05. The horizontal axis is labeled Temperature (° C.) with 0° C. and 300° C. as the end points with additional marks or ticks spaced along this axis in increments of 12.5° C. therebetween.

Thermal stability was also measured for a polymer matrix functionalized with liquid crystals using a thermogravimetric analyzer. FIG. 2 is an exemplary line graph of the thermogravimetric analysis results showing thermal degradation in percent weight change (left vertical axis) and weight change in milligrams (right vertical axis) versus temperature in degrees Celsius for the polymer matrix functionalized with liquid crystals. A two-step degradation is observed in FIG. 2 at about 350° C. and about 445° C., which indicates the presence of cholesteryl oleate grafts on the siloxane backbone of the polymer matrix functionalized with liquid crystals. The weight loss at 350° C. is due to the degradation of the grafted cholesteryl oleate units and the weight loss at 445° C. is due to decomposition of the polymer chain.

In the line graph shown in FIG. 2, the left vertical axis is labeled TG % with 55 and 110 as the respective first and last marks or ticks with additional marks or ticks spaced along this axis in increments of 5. The right vertical axis is labeled TG mg with 15 and 26 as the respective first and last marks or ticks with additional marks or ticks spaced along this axis in increments of 1. The horizontal axis is labeled Temp Cel with 50° C. and 500° C. as the respective first and last marks or ticks with additional marks or ticks spaced along this axis in increments of 50° C.

In addition to differential scanning calorimetry and thermogravimetric analysis testing, an optical microscopy analysis was also performed on a polymer matrix functionalized with liquid crystals in accordance with exemplary embodiments disclosed herein. Lamellar ordering was observed (under crossed polarizers) in the liquid crystalline domains incorporated into the amorphous silicone matrix.

Aspects of the present disclosure will be further illustrated by the following examples that include polymer matrices functionalized with liquid crystals in accordance with exemplary embodiments disclosed herein. These examples (as are all examples provided herein) are merely illustrative, and do not limit this disclosure to the particular formulations in any way.

The table below sets forth the thermal conductivity, electrical resistivity, and stability for a first pure silicone sample and second and third samples of polymer matrices functionalized with liquid crystals in accordance with exemplary embodiments disclosed herein. The first sample or test specimen included pure silicone, which was not functionalized with liquid crystals or loaded with any thermally conductive filler. The second sample or test specimen included a functionalized silicone matrix with 10 wt % (weight percent) of siloxane-liquid crystals. The third sample or test specimen included a functionalized silicone matrix with 20 wt % of siloxane-liquid crystals. The host silicone matrices of the second and third samples were not loaded with any thermally conductive filler. In addition, the host silicone matrices was a two-part silicone matrix, which in these examples was a thermally curable silicone rubber from Dow Corning Corporation that includes two-parts, namely vinyl-terminated PDMS chains (Part A) and PDMS chains.

| Sample | Thermal Conductivity (W/m-K) | Percentage Increase | Electrical Resistivity (ohm-cm) | Stability |
|---|---|---|---|---|
| pure silicone | 0.14 | — | Insulating | Gel |
| f-silicone matrix with siloxane-liquid crystals (10 wt %) | 0.155 | 10.7% | Insulating | Gel |
| f-silicone matrix with siloxane-liquid crystals (20 wt %) | 0.158 | 12.8 % | Insulating | Gel |

As shown by the tabulated test results above, the pure silicone had a thermal conductivity of about 0.14 Watts per meter Kelvin (W/m-K). The functionalized polymer with 10 wt % of liquid crystals had a thermal conductivity of about 0.155 W/m-K, which represents about a 10.7% increase in thermal conductivity as compared to pure silicone. The functionalized polymer with 20 wt % of liquid crystals had a thermal conductivity of about 0.158 W/m-K, which represents about a 12.8% increase in thermal conductivity as compared to pure silicone. Generally, these test results show the improvement in thermal conductivity values (compare 0.155 and 0.158 for samples 3 and 4 with 0.14 for sample 1) that may be realized by the functionalization of the polymer matrices by incorporating liquid crystals and with good retention of deflection properties and electrical insulation properties.

Aspects of the present disclosure are further illustrated by the following examples of thermally conductive polymer composites that include polymer matrices functionalized with liquid crystals in accordance with exemplary embodiments disclosed herein. These examples (as are all examples provided herein) are merely illustrative, and do not limit this disclosure to the particular formulations in any way.

The table below sets forth thermal conductivity for four test specimens or samples (2, 3, 5, and 7) of thermally conductive polymer composites having polymer matrices functionalized with liquid crystals in accordance with exemplary embodiments disclosed herein. Comparison studies were also carried out for three test specimens or samples (1, 4, and 6) of thermally conductive polymer composites having polymer matrices that were not functionalized with liquid crystals. These studies revealed that the functionalization of polymer matrices by incorporating liquid crystals improves or enhances thermal conductivity of the thermally conductive composites including the functionalized polymer matrices, while also having good retention of deflection properties and electrical insulation properties.

| Sample | Sample Name | Thermal Conductivity (W/m-K) |
|---|---|---|
| 1 | Tflex 300 thermal gap filler | 1.18 |
| 2 | Tflex 300 + 10 wt % Liquid Crystals | 1.26 |
| 3 | Tflex 300 + 20 wt % Liquid Crystals | 1.32 |
| 4 | Silicone + 80 wt % Silver-Coated Copper | 1.42 |
| 5 | Silicone + 80 wt % Silver-Coated Copper + 20 wt % Liquid Crystals | 1.6 |
| 6 | Tflex 600 thermal gap filler | 2 |
| 7 | Tflex 600 + 20 wt % Liquid Crystals | 2.2 |

With continued reference to the table above, the first sample included a Tflex™ 300 series thermal gap filler available from Laird Technologies, Inc., which thermal gap filler was not functionalized with liquid crystals. The second and third samples also included Tflex™ 300 series thermal gap fillers. But with the second and third samples, the polymer matrices were respectively functionalized with 10 wt % liquid crystals (sample 2) and with 20 wt % liquid crystals (sample 3). As shown by the tabulated test results above, the first sample without liquid crystal functionalization had a thermal conductivity of about 1.18 W/m-K. The second sample with 10 wt % liquid crystals had a thermal conductivity of about 1.26 W/m-K, which represents about a 6.8% increase in thermal conductivity as compared to sample 1. The third sample with 20 wt % liquid crystals had a thermal conductivity of about 1.32 W/m-K, which represents about a 11.9% increase in thermal conductivity as compared to sample 1.

The fourth and fifth samples included silicone matrices loaded with about 80 wt % of silver-coated copper particles. With the fifth sample, the silicone matrix was functionalized with 20 wt % liquid crystals. The silver-coated copper particles were obtained from nanotechnology, grade silver copper 16010F. As shown by the tabulated test results above, the fourth sample without liquid crystal functionalization had a thermal conductivity of about 1.42 W/m-K. The fifth sample with 20 wt % liquid crystals had a thermal conductivity of about 1.6 W/m-K, which represents about a 12.7% increase in thermal conductivity as compared to sample 4.

The sixth and seventh samples included Tflex™ 600 series thermal gap fillers available from Laird Technologies, Inc. The sixth sample was not functionalized with liquid crystals. With the seventh sample, the polymer matrix was functionalized with 20 wt % liquid crystals. As shown by the tabulated test results above, the sixth sample without liquid crystal functionalization had a thermal conductivity of about 2 W/m-K. The seventh sample with 20 wt % liquid crystals had a thermal conductivity of about 2.2 W/m-K, which represents about a 10% increase in thermal conductivity as compared to sample 6.

In exemplary embodiments, the host matrix and liquid crystals may comprise a wide range of materials. By way of example, the liquid crystals may comprise cholesteryl ester based liquid crystalline units, cholesteryl oleate, etc. Also by way of example, the matrix may comprise a two-part silicone matrix including polydimethylsiloxane (PDMS) available from Dow Corning Corporation, etc. As another example, the matrix may comprise epoxy, such as an epoxide or other epoxy compound. As used herein, the term "epoxy" generally refers to and includes compounds in which an oxygen atom is directly attached to two adjacent or non-adjacent carbon atoms of a carbon chain or ring system, thus cyclic ethers. The term epoxides represents a subclass of epoxy compounds containing a saturated three-membered cyclic ether; thus oxirane derivatives, e.g., 1,2-epoxypropane, or 2-methyloxirane (an epoxide); 9,10-epoxy-9,10-dihydroanthracene (an epoxy compound).

Other suitable polymeric organosilicon compounds and polymers may also be used for the matrix, such as elastomers, natural rubbers, synthetic rubbers, ethylene-propylene diene monomer (EPDM) rubber, fluorosilicone, isoprene, nitrile, chlorosulfonated polyethylene, neoprene, fluoroelastomer, urethane, thermoplastic elastomer (TPE), polyamide TPE and thermoplastic polyurethane (TPU), acrylonitrile butadiene styrene (ABS) (chemical formula $(C_8H_8 \cdot C_4H_6 \cdot C_3H_3N)_n$), polycarbonate/acrylonitrile butadiene styrene alloys (PC-ABS), polybutylene terephthalate, polyphenylene oxide, polyphthalamidepolyphenylene sulfide) (PPS), polyphenylene ether, modified polyphenylene ether containing polystyrene, liquid crystal polymers, polystyrene, styrene-acrylonitrile copolymer, rubber-reinforced polystyrene, poly ether ether ketone (PEEK), acrylic resins, polymers and copolymers of alkyl esters of acrylic and methacrylic acid styrene-methyl methacrylate copolymer, styrene-methyl methacrylate-butadiene copolymer, polymethyl methacrylate, methyl methacrylate-styrene copolymer, polyvinyl acetate, polysulfone, polyether sulfone, polyether imide, polyarylate, polyamideimide, polyvinyl chloride, vinyl chloride-ethylene copolymer, vinyl chloride-vinyl acetate copolymer, polyimides, polyamides, polyolefins, polyethylene, ultra high molecular weight polyethylene, high density polyethylene, linear low density polyethylene, polyethylene napthalate, polyethylene terephthalate, polypropylene, chlorinated polyethylene, ethylene acrylic acid copolymers, nylon, nylon 6, nylon 6,6, phenylene oxide resins, phenylene sulfide resins, polyoxymethylenes, polyesters, polyvinyl chloride, vinylidene chloride/vinyl chloride resins, vinyl aromatic resins, polystyrene, poly(vinylnaphthalene), poly(vinyltoluene), polyaryletheretherketone, polyphthalamide, polyaryletherketone, polycarbonate, polyphenylene, or combinations thereof.

Thermally conductive polymer composites including polymer matrices functionalized with liquid crystals as disclosed herein may be used in a wide range of applications, such as thermal interface materials. For example, thermal interface materials may include a polymer matrix functionalized with liquid crystals, such as cholesteryl ester based liquid crystalline units, among other suitable liquid crystal containing species or materials, etc. This functionalization improves or enhances thermal conductivity of the matrix as well as the thermal conductivity of the thermal interface material including the matrix. In addition, the thermal interface material may also be dielectric or electrically insulating. In such embodiments, a thermal interface material may also be referred to as a thermally conductive dielectric or thermally conductive electrical insulator. The thermal interface material may also retain or have similar deflection properties as the original host matrix after the functionalization by or incorporation of the liquid crystals.

In some preferred exemplary embodiments, the matrix material is selected so that the resulting thermal interface material will be conformable to one or more surfaces, such as opposing surfaces of a heat transfer device (e.g., heat sink, etc.) and electronic component (e.g., PCB-mounted electronic component, etc.). In such embodiments, a conformable or compliant thermal interface material including a polymer matrix functionalized with liquid crystals may have a sufficiently low modulus of elasticity (e.g., less than $10^6$ Pascals as determined by ASTM D5934-02, etc.) to conform to surfaces under normal operating pressures and temperature of e.g., electronic components. This conformability of the thermal interface material helps to eliminate, minimize, or at least reduce air gaps or voids when the thermal interface material is between opposing surfaces. This, in turn, increases thermal transfer efficiency as the thermal interface material is a better thermal conductor than would be if the gaps were filled with air. By way of example, exemplary embodiments of a thermal interface material including a polymer matrix functionalized with liquid crystals may have characteristics or properties similar or identical to thermal interface materials available from Laird Technologies, Inc., such as Tflex™, TpIi™, and Tputty™ gap filler products, etc. By way of further example, a thermal interface material including a polymer matrix functionalized with liquid crystals may be configured so that it will deflect to a percentage (e.g., within a range from about 25% to about 50%, etc.) of its original thickness at a pressure of 50 pounds per square inch. This high rate of compliancy allows the thermal interface material to blanket or cover a surface thereby enhancing thermal transfer. The thermal interface material may have a very low compression set enabling it to be reused many times and/or may recover to 90% of its original thickness after compression under low pressure and/or may have a hardness of 70, 50, 45, 40, 35, 25, or 20 Shore 00 as determined by ASTM D2240.

In exemplary embodiments, one or more thermally conductive fillers may be added to the polymer matrix to further improve or enhance thermal conductivity. Exemplary thermally conductive fillers include metal particles, ceramic particles, carbon-containing species (e.g., graphite, graphene, carbon nanotubes, etc.) fibers that are compliant or conformable, boron nitride, aluminum, aluminum oxide, alumina trihydrate, zinc oxide, combinations thereof, etc. In some preferred embodiments, the thermally conductive fillers have a thermal conductivity of at least 1 W/m-K or more, such as a copper filler having thermal conductivity up to several hundred W/mK, etc. In addition, exemplary embodiments of a thermal interface material may also include different grades (e.g., different sizes, different purities, different shapes, etc.) of the same (or different) thermally conductive fillers. For example, a thermal interface material may include two different sizes of boron nitride. By varying the types and grades of thermally conductive fillers, the final characteristics of the thermal interface material (e.g., thermal conductivity, cost, hardness, etc.) may be varied as desired.

Even though thermally conductive fillers may be added, this is not required for all embodiments as alternative embodiments may include thermally conductive composite materials and thermal interface materials without any thermally conductive fillers. In some embodiments, fillers may be distributed in a thermal interface material in a manner such that the fillers contact each other, which may enhance the ability of the thermal interface material to conduct heat, for example, in the Z axis direction.

With the higher thermal conductivity of the polymer matrix functionalized with liquid crystals, a thermal interface material including the polymer matrix may thus have a higher thermal conductivity with a lower amount of the thermally conductive filler loading. This, in turn, may allow a thermal conductivity of 8 W/m-K or more to be achievable by a thermal interface material including a polymer matrix, thermally conductive fillers, and liquid crystalline units grafted onto the silicone chains of the polymer matrix. Additionally, a thermal interface material disclosed herein may also be able achieve a thermal conductivity higher or lower than 8 W/m-K (e.g., 1 W/m-K, 1.1 W/m-K, 1.2 W/m-K, 2.8 W/m-K, 3 W/m-K, 4 W/m-K, 5 W/m-K, 6 W/m-K, etc.) depending on the particular materials used to make the thermal interface material and loading percentage of the thermally conductive filler, if any.

A wide variety of other fillers and/or additives may be added to achieve various desired outcomes. Examples of other fillers and/or additives include pigments, plasticizers, process aids, flame retardants, extenders, electromagnetic interface (EMI) or microwave absorbers, electrically-conductive fillers, magnetic particles, etc. For example, tackifying agents, etc. may be added to increase the tackiness of a thermal interface material, etc. As another example, EMI or microwave absorbers, electrically-conductive fillers, and/or magnetic particles may be added such that a thermal interface material is also operable or usable as an EMI and/or RFI shielding material. A wide range of materials may be added to a thermal interface material, such as carbonyl iron, iron silicide, iron particles, iron-chrome compounds, metallic silver, carbonyl iron powder, SENDUST (an alloy containing 85% iron, 9.5% silicon and 5.5% aluminum), permalloy (an alloy containing about 20% iron and 80% nickel), ferrites, magnetic alloys, magnetic powders, magnetic flakes, magnetic particles, nickel-based alloys and powders, chrome alloys, and any combinations thereof. Other embodiments may include one or more EMI absorbers formed from one or more of the above materials where the EMI absorbers comprise one or more of granules, spheroids, microspheres, ellipsoids, irregular spheroids, strands, flakes, powder, and/or a combination of any or all of these shapes.

Advantageously, thermally conductive composites having polymer matrices functionalized with liquid crystals as disclosed herein may have higher thermal conductivities at equal or lower amounts of thermally conductive filler loadings, while retaining or having good retention of deflection properties and electrical insulation properties. In exemplary embodiments disclosed herein, this has been achieved by grafting liquid crystalline units (e.g., as an cholesteryl oleate, etc.) onto the silicone matrix in different weight percentages. This results in formation of liquid crystalline domains in the amorphous silicone matrix. This functionalization of the polymer matrix results in enhanced thermal conductivities of both the polymer matrix and composite that includes the functionalized polymer matrix.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal interface material comprising a polymer matrix functionalized with liquid crystals grafted onto the polymer matrix, and at least one thermally conductive filler in the polymer matrix, wherein the thermal interface material has a thermal conductivity of at least 1 Watt per meter Kelvin.

2. The thermal interface material of claim 1, wherein the liquid crystals are grafted onto siloxane chains of the polymer matrix.

3. The thermal interface material of claim 1, wherein the liquid crystals comprise liquid crystalline units grafted onto siloxane chains of the polymer matrix.

4. The thermal interface material of claim 1, wherein:
the polymer matrix comprises a silicone matrix; and
the liquid crystalline units are grafted onto silicone chains of the silicone matrix.

5. The thermal interface material of claim 1, wherein the thermal interface material includes liquid crystalline domains in an amorphous silicone matrix.

6. The thermal interface material of claim 5, wherein the liquid crystalline domains in the amorphous silicone matrix have a lamellar ordering.

7. The thermal interface material of claim 1, wherein the at least one thermally conductive filler has a thermal conductivity of at least 1 Watt per meter Kelvin.

8. A thermally conductive composite comprising a polymer matrix functionalized with liquid crystals grafted onto the polymer matrix, and at least one thermally conductive filler in the polymer matrix, wherein the thermally conductive composite includes a reaction product of cholesteryl oleate and the polymer matrix.

9. A thermally conductive composite comprising a polymer matrix functionalized with liquid crystals grafted onto the polymer matrix, and at least one thermally conductive filler in the polymer matrix, wherein cholesteryl oleate grafts are on a siloxane backbone of the polymer matrix and/or the liquid crystals comprise cholesteryl oleate liquid crystalline units grafted onto silicone chains of the silicone matrix.

10. A thermally conductive composite comprising a polymer matrix functionalized with liquid crystals grafted onto the polymer matrix, and at least one thermally conductive filler in the polymer matrix, wherein:
the polymer matrix comprises a two-part silicone matrix including polydimethylsiloxane (PDMS) chains and vinyl-terminated PDMS chains; and
the liquid crystals are attached to vinyl-terminated PDMS chains.

11. A thermal interface material including the thermally conductive composite of claim 10, wherein the thermal interface material has a thermal conductivity of at least 1 Watt per meter Kelvin.

12. The thermal interface material of claim 1, wherein:
functionalization of the polymer matrix with liquid crystals enhances thermal conductivity while retaining deflection and electrical insulation properties such that the functionalized polymer matrix is thermally conductive and dielectric; and/or
functionalization of the polymer matrix with liquid crystals enhances thermal conductivity without having to increase a loading amount of thermally conductive filler in the polymer matrix.

13. A conformable thermal interface material including a thermally conductive composite comprising a polymer matrix functionalized with liquid crystals grafted onto the polymer matrix, and a least one thermally conductive filler in the polymer matrix, whereby the conformable thermal interface material is suitable for use to fill a gap between at least two surfaces to transfer heat between the at least two surfaces, and wherein:
the at least one thermally conductive filler comprises one or more of metal particles, ceramic particles, carbon-containing species fibers, graphite, graphene, carbon nanotubes, boron nitride, aluminum, aluminum oxide, alumina trihydrate, and zinc oxide; and/or
the at least one thermally conductive filler has a thermal conductivity of at least 1 Watt per meter Kelvin.

14. A method comprising modifying liquid crystals and incorporating the modified liquid crystals into a polymer matrix, such that the modified liquid crystals are grafted onto the polymer matrix, and adding at least one thermally conductive filler in the polymer matrix, wherein:
the liquid crystals comprise cholesteryl ester based liquid crystalline units; and
the at least one thermally conductive filler comprises one or more of metal particles, ceramic particles, carbon-containing species, fibers graphite, graphene, carbon nanotubes, boron nitride, aluminum, aluminum oxide, alumina trihydrate, and zinc oxide; and/or the at least one thermally conductive filler has a thermal conductivity of at least 1 Watt per meter Kelvin.

15. The method of claim 14, wherein the method includes grafting liquid crystalline units onto siloxane chains of the polymer matrix, and wherein the at least one thermally conductive filler has a thermal conductivity of at least 1 Watt per meter Kelvin.

16. The method of claim 15; wherein grafting of the liquid crystalline units onto the siloxane chains of the polymer matrix generates liquid crystalline domains in the amorphous silicone matrix having lamellar ordering.

17. A method comprising modifying liquid crystals and incorporating the modified liquid crystals into a polymer matrix, such that the modified liquid crystals are grafted onto the polymer matrix, and adding at least one thermally conductive filler in the polymer matrix; wherein the method includes using a cross linker attached to liquid crystalline units to decouple the liquid crystalline units from a polymer backbone of the polymer matrix, wherein:

the at least one thermally conductive filler comprises one or more of metal particles, ceramic particles, carbon-containing species, fibers, graphite, graphene, carbon nanotubes, boron nitride, aluminum, aluminum oxide, alumina trihydrate, and zinc oxide; and/or the at least one thermally conductive filler has a thermal conductivity of at least 1 Watt per meter Kelvin.

18. The method of claim 17, wherein the method includes using a Si—H group of the cross linker attached to the liquid crystalline units to attach the liquid crystalline units onto silicone chains of a first part of the polymer matrix via a hydrosilation reaction.

19. The method of claim 18, wherein the method includes annealing the silicone chains with the liquid crystalline units attached thereto.

20. The method of claim 19, wherein:

the polymer matrix comprises a two-part silicone matrix including polydimethylsiloxane (PDMS) chains and vinyl-terminated PDMS chains;

the liquid crystalline units are attached to the vinyl-terminated PDMS chains; and the method includes curing the PDMS chains and the vinyl-terminated PDMS chains with the liquid crystalline units attached thereto.

21. The method of claim 17, wherein
the liquid crystals comprise cholesteryl ester based liquid crystalline units.

22. A method of enhancing thermal conductivity of a polymer matrix, the method comprising modifying liquid crystals and incorporating the modified liquid crystals into the polymer matrix, such that the modified liquid crystals are grafted onto the polymer matrix;

wherein:

the method includes using a cross linker attached to liquid crystalline units to decouple the liquid crystalline units from a polymer backbone of the polymer matrix;

the method includes using a Si—H group of the cross linker attached to the liquid crystalline units to attach the liquid crystalline units onto silicone chains of a first part of the polymer matrix via a hydrosilation reaction;

the method includes annealing the silicone chains with the liquid crystalline units attached thereto;

the polymer matrix comprises a two-part silicone matrix including polydimethylsiloxane (PDMS) chains and vinyl-terminated PDMS chains;

the liquid crystalline units are attached to the vinyl-terminated PDMS chains;

the method includes curing the PDMS chains and the vinyl-terminated PDMS chains with the liquid crystalline units attached thereto;

the annealing occurs at a temperature about 38° C. for about 12 hours; and curing occurs at about 100° C.

* * * * *